No. 787,619.
PATENTED APR. 18, 1905.
I. GERMAN.
LAWN MOWER.
APPLICATION FILED NOV. 5, 1904.
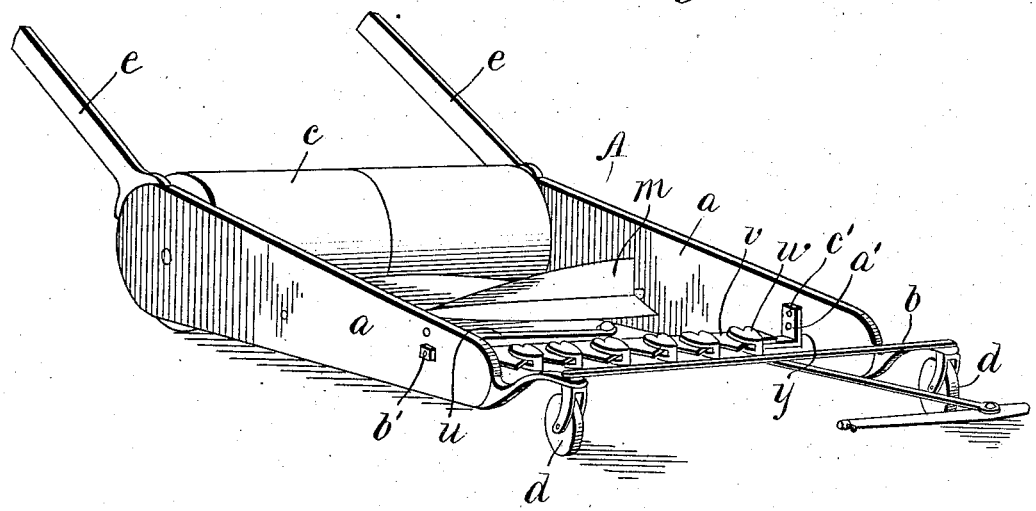
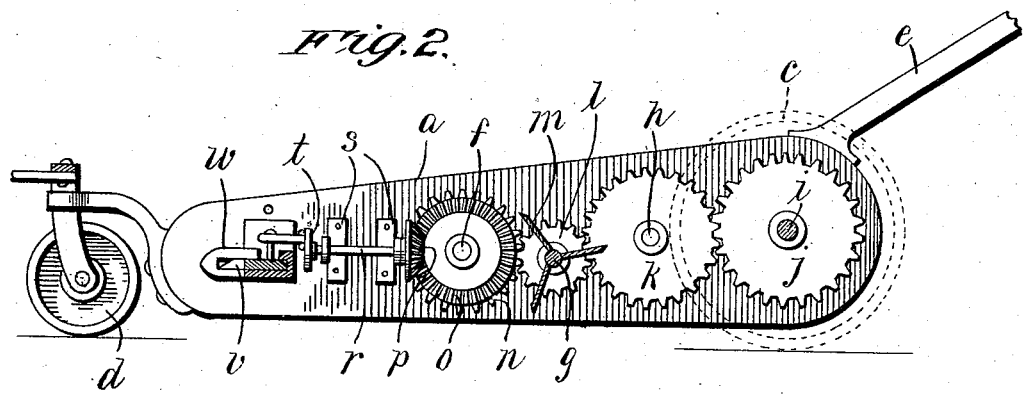
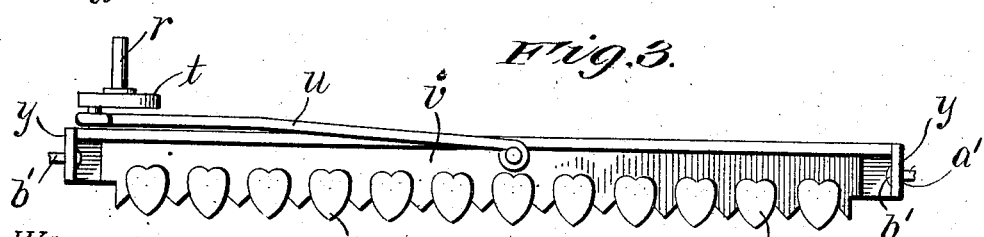
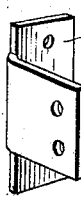
WITNESSES:
INVENTOR
Isaac German
By Wm. H. Bates
Attorney No. 787,619. Patented April 18, 1905.

UNITED STATES PATENT OFFICE.

ISAAC GERMAN, OF BALTIMORE, MARYLAND.

LAWN-MOWER.

SPECIFICATION forming part of Letters Patent No. 787,619, dated April 18, 1905.

Application filed November 5, 1904. Serial No. 231,475.

*To all whom it may concern:*

Be it known that I, ISAAC GERMAN, a citizen of the United States, residing at Baltimore city, State of Maryland, have invented new and useful Improvements in Lawn-Mowers, of which the following is a specification.

My invention relates to improvements in lawn-mowers; and it consists in the novel construction, combination, and arrangement of parts of which it is composed, all as will be hereinafter more fully explained, and particularly pointed out in the appended claim.

The annexed drawings, to which reference is made, fully illustrate my invention, in which—

Figure 1 represents a perspective view of my improved lawn-mower. Fig. 2 is a longitudinal vertical sectional view of the same. Fig. 3 is a plan view of the knife or cutter bar removed from the machine, and Fig. 4 is a perspective detail view of the bracket or bearing for the eccentric-shaft.

Referring by letter to the accompanying drawings, A designates the frame of a mowing-machine consisting of the side bars *a a* and a front transverse bar *b*, which frame is provided with a transporting-roller *c* at the rear end thereof and caster-wheels *d d* at the forward or front portion. Handles *e e* are arranged at the rear of the mower and are secured at the rear end of each side bar aforesaid.

Connecting the two side bars are transverse shafts *f*, *g*, *h*, and *i*. The latter shaft is arranged at the rear end of the machine and upon which is the transporting-roller *c* and a gear-wheel *j*, which meshes with a gear-wheel *k* on the shaft *h*, which latter in turn engages a smaller gear-wheel *l* on the shaft *g*, carrying the revolving blades or cutter *m*, and this smaller wheel engages a gear-wheel *n* on the shaft *f*. Said last-named gear-wheel is provided on its face with a beveled gear-wheel *o*, that engages a beveled pinion *p* on a longitudinally-journaled shaft *r*, that is journaled in bearings secured to the inner face of one of the side bars. This shaft *r* is provided at its forward end with a disk *t*, to which is eccentrically connected one end of a pitman *u*, while the opposite end of said pitman is pivoted to the cutter-bar *v* about its center, said cutter-bar engaging a transverse guard or bar *w* of peculiar construction, the same being pointed at the forward end, as at *x*, and broad at the rear, as shown in Fig. 3, in the form of a heart, while the two opposite ends *y y* are bent upward at right angles to the body portion, and each is provided with a perforation *a'*, through which passes a bolt *b'*, that secures said guard to the inside faces of each side board or bar. These bars are provided with two or more vertical perforations *c'*, whereby the front cutter-bar can be adjusted vertically in raising or lowering the same to permit grass of different heights to be cut. This is accomplished by withdrawing the blots *b'* and raising or lowering the guard, with its cutter-bar, when the bolts are again inserted in the proper perforations. This relative positioning of the reciprocating cutter *v* at the front and the revolving cutters *m* to the rear the former cuts in advance of the latter, and thus prepares the material engaged to be presented to the revolving cutter more advantageously than were it primarily severed by them. The sequential engagement of the cutters also lessens the probability of the revolving cutters becoming clogged by heavy material.

It will be observed from the above description when taken in connection with the annexed drawings that I employ a train of gearing, as well as a horizontal transverse cutter-bar, that can be adjusted vertically for tall grass or weeds and a revolving cutter in rear of this cutter-bar for cutting the short grass and which can be used with or without a draft-animal. If with the latter, a swingletree is provided in front, as shown in Fig. 1 of the drawings.

In operation the mower in moving forward revolves the large roller at the rear thereof, which imparts motion to the train of gear-wheels, thus revolving the shaft, and through the medium of the pitman the cutter-bar is operated and simultaneously the blades of the rear cutter are revolved by the small interposed gear-wheel when said train of gearing is in motion. At the same time the cutter-bar can be readily adjusted to cut weeds and tall grass and may be adjusted to cut about one-half an inch higher than the revolving cutter and still higher cutting, if desired, by using the upper perforations. Thus it will be seen that I combine with a revolving cutter a cutting-bar which mows down the weeds before said weeds can reach the revolving cutter and clog or choke it, and the device as herein described is simple in operation, durable, and at the same time cheap to manufacture.

Having thus described my invention, what I claim, and desire to secure by Letters Patent, is—

A lawn-mower comprising a suitable frame, caster-rollers carrying the forward end of the mower, transversely-positioned shafts $i$, $h$, $g$, and $f$ mounted in the frame, a transportation-roller journaled on the shaft $i$, a gear-wheel journaled on the shaft $i$, an idler-gear $k$, loosely mounted on the shaft $h$, a gear $l$ mounted on the revolving cutter-shaft, and the gear $n$ on the shaft $f$ formed with a bevel-face gearing $o$, a longitudinally-arranged shaft, a bevel-gear thereon to mesh with the gear $o$, a disk fixedly secured on the longitudinal shaft, a pitman eccentrically connected to the disk, reciprocable cutters mounted at the front of the machine and operated by the pitman and revolving cutters mounted on the shaft $g$, whereby the material is given a preliminary severance in advance of the cut of the revolving cutters.

In testimony whereof I affix my signature in presence of two subscribing witnesses.

ISAAC GERMAN.

Witnesses:
J. P. SCHUTZ,
CHARLES WOERNLENE.